(12) United States Patent
Tang et al.

(10) Patent No.: US 10,065,346 B2
(45) Date of Patent: Sep. 4, 2018

(54) MANUFACTURING METHOD AND MANUFACTURING DEVICE FOR INTEGRALLY FORMING WATERPROOF STRUCTURE FOR 3C ELECTRONIC PRODUCT

(71) Applicant: GUANGDONG JANUS INTELLIGENT GROUP CORPORATION LIMITED, Dongguan (CN)

(72) Inventors: Zhen Tang, Dongguan (CN); Yongfeng Zhou, Dongguan (CN); Changming Wang, Dongguan (CN); Shoude Xie, Dongguan (CN)

(73) Assignee: GUANGDONG JANUS INTELLIGENT GROUP CORPORATION LIMITED, Dongguan, Guangdong (CN)

( * ) Notice: Subject to any disclaimer, the term of this patent is extended or adjusted under 35 U.S.C. 154(b) by 89 days.

(21) Appl. No.: 15/013,488

(22) Filed: Feb. 2, 2016

(65) Prior Publication Data

US 2016/0144541 A1 May 26, 2016

Related U.S. Application Data

(63) Continuation of application No. PCT/CN2014/082230, filed on Jul. 15, 2014.

(30) Foreign Application Priority Data

May 29, 2014 (CN) .......................... 2014 1 0235833

(51) Int. Cl.
*B29C 45/14* (2006.01)
*B29C 45/40* (2006.01)
(Continued)

(52) U.S. Cl.
CPC .......... *B29C 45/0001* (2013.01); *B29C 45/02* (2013.01); *B29C 45/14* (2013.01);
(Continued)

(58) Field of Classification Search
CPC ................ B29C 45/0001; B29C 45/02; B29C 45/14336; B29C 45/14459;
(Continued)

(56) References Cited

U.S. PATENT DOCUMENTS 3,619,458 A * 11/1971 Engelhardt ....... B29C 45/14336
264/240
4,006,210 A * 2/1977 Denton ............. B29C 45/14336
264/250
(Continued)

FOREIGN PATENT DOCUMENTS

CN 1443639 9/2003
CN 1861366 11/2006
(Continued)

OTHER PUBLICATIONS

Deng, Wanguo, "Die and Mould Technology", China Academic Journal Electronic Publishing House, No. 5, 4 pages, Jul. 1, 2005.
(Continued)

*Primary Examiner* — Robert B Davis
(74) *Attorney, Agent, or Firm* — Hamre, Schumann, Mueller & Larson, P.C.

(57) ABSTRACT

A manufacturing method and a manufacturing device for integrally forming a waterproof structure for a 3C electronic product, and the method includes the following steps: a. feeding a predetermined amount of a solid silicone raw material into a sprue; b. extruding the solid silicone raw material in the sprue, so that the solid silicone raw material flows into, through a silicone inlet channel, a waterproof structure cavity in a mold in which a product is placed; and
(Continued)

c. heating the flowable solid silicone with a high temperature in the mold to have a vulcanization reaction, and finally to integrally form a silicone waterproof structure on the product. The waterproof structure is of a great waterproof performance, good material toughness, small wear when being used repeatedly, and great fatigue resistance.

10 Claims, 6 Drawing Sheets

(51) Int. Cl.
    *B29C 45/00*     (2006.01)
    *B29C 45/02*     (2006.01)
    *H04M 1/18*     (2006.01)
    *B29K 83/00*     (2006.01)
    *B29K 105/00*     (2006.01)
    *B29L 31/34*     (2006.01)
    *B29L 31/26*     (2006.01)
    *B29C 45/26*     (2006.01)

(52) U.S. Cl.
    CPC ........ *B29C 45/14336* (2013.01); *B29C 45/40* (2013.01); *H04M 1/18* (2013.01); *B29C 2045/14459* (2013.01); *B29C 2045/2604* (2013.01); *B29C 2045/4057* (2013.01); *B29K 2083/00* (2013.01); *B29K 2105/25* (2013.01); *B29K 2995/0093* (2013.01); *B29L 2031/26* (2013.01); *B29L 2031/34* (2013.01); *B29L 2031/3437* (2013.01)

(58) Field of Classification Search
    CPC ........ B29C 45/4005; B29C 2045/4057; B29C 2045/2604; B29L 2031/3437; B29L 2031/26; B29L 2031/34
    See application file for complete search history.

(56) References Cited

U.S. PATENT DOCUMENTS

| | | | | |
|---|---|---|---|---|
| 4,247,510 | A | * | 1/1981 | Desverchere ..... B29C 45/14336 264/236 |
| 5,609,894 | A | * | 3/1997 | Rathbun ............. B29C 45/4407 264/334 |
| 7,056,464 | B2 | * | 6/2006 | Antonini ........... B29C 45/14336 264/255 |
| 7,435,371 | B2 | * | 10/2008 | Eno ........................ B29C 35/18 264/238 |

FOREIGN PATENT DOCUMENTS

| | | | |
|---|---|---|---|
| CN | 101583247 | | 11/2009 |
| CN | 201848969 | | 6/2011 |
| CN | 203077540 | | 7/2013 |
| CN | 203457449 | | 2/2014 |
| JP | 2005053129 A | * | 3/2005 ......... B29C 45/4005 |
| KR | 10-2011-0136996 | | 6/2013 |

OTHER PUBLICATIONS

International Search Report, issued in the corresponding International Application No. PCT/CN2014/082230, dated Feb. 27, 2015, 5 pages.
Notice of Grounds for Rejection issued in Korean Application No. 10-2016-7005631, dated Mar. 31, 2017.

* cited by examiner

MANUFACTURING METHOD AND MANUFACTURING DEVICE FOR INTEGRALLY FORMING WATERPROOF STRUCTURE FOR 3C ELECTRONIC PRODUCT

BACKGROUND

Technical Field

The present disclosure relates to manufacturing a housing for a consumer electronic product, and in particular, to a manufacturing method and a manufacturing device for integrally forming a waterproof structure for a computer, communication, and consumer electronic (3C electronic product).

Related Art

Regarding manufacturing of a waterproof structure for a 3C electronic product, a silicone waterproof ring is provided on a slot or a rib of a plastic structure by using methods such as spreading and bonding, and ultrasonic welding, or a silicone waterproof ring is formed by using a plastic and thermoplastic polyurethanes (TPU) two-color molding method. The methods such as spreading and bonding, and ultrasonic welding need manual operations, and therefore, assembly accuracy and stability cannot be guaranteed, and a waterproof effect is also poor. Regarding the plastic and TPU two-color molding method, the hardness of a TPU material is excessively high, and therefore, a waterproof grade of a molded product is substantially limited. Another method for manufacturing a waterproof structure is liquid silicone molding. A waterproof performance of a silicone waterproof structure manufactured by liquid silicone molding is stable. However, due to great mobility of liquid silicone, disadvantages such as a crushed damage on an outer appearance of a product and overflow of silicone would easily occur, so as to affect the waterproof performance and yield. Meanwhile, a molding device is expensive, and a mixing system for mixing an agent A and an agent B needs to be further equipped. Therefore, the production cost is high and it is hard to improve the yield.

Conventional solid silicone processing is usually used to manufacture a product made of pure silicone or made by mixing silicone and other raw materials, and generally relates to filling materials such as solid silicone in a hot pressing mold and then directly performing hot pressing. A conventional hot pressing molding machine is of a simple structure and low accuracy. The quality of a product manufactured by the conventional hot pressing molding machine is poor. The conventional hot pressing molding machine cannot manufacture a complex and highly accurate product, and cannot be used to manufacture a silicone waterproof structure for a 3C electronic product.

SUMMARY

With regard to deficiencies of the prior art, a main objective of the present disclosure is to provide a manufacturing method and a manufacturing device for integrally forming a waterproof structure for a 3C electronic product.

To realize the aforementioned objective, the present disclosure adopts technical solutions below.

A manufacturing method for integrally forming a waterproof structure for a 3C electronic product includes the following steps:

a. feeding a predetermined amount of a solid silicone raw material into a sprue;

b. extruding the solid silicone raw material in the sprue, so that the solid silicone raw material flows into, through a silicone inlet channel, a waterproof structure cavity in a mold in which a product is placed; and c. heating the solid silicone with a high temperature in the mold to have a vulcanization reaction, and finally to integrally form a silicone waterproof structure on the product.

Further, the method further includes the following step after step c:

d. separating an upper mold part of the mold upwardly from a lower mold part for supporting the product, and ejecting the product with the silicone waterproof structure upward from the lower mold part by using an ejection mechanism provided in the lower mold part.

A manufacturing device for integrally forming a waterproof structure for a 3C electronic product includes: a mold including an upper mold part and a lower mold part, where a product cavity for placing a product and a waterproof structure cavity connected to the product cavity and configured to form a waterproof structure on the product are formed when the upper mold part and the lower mold part are joined; the upper mold part is opened with a solid silicone raw material sprue; the sprue is in communication with the waterproof structure cavity through a silicone inlet channel; the mold is provided with a material pressing device matching the sprue; and the material pressing device is configured to extrude a solid silicone raw material in the sprue, so that the solid silicone raw material flows into the waterproof structure cavity through the silicone inlet channel.

According to preferred embodiments, technical solutions of the present disclosure may further include technical features below.

The upper mold part includes an upper plate and a middle plate below the upper plate; the sprue is opened at the top of the middle plate; the material pressing device includes a material pressing column provided at the bottom of the upper plate; the upper plate and the middle plate can be joined or separated; and when the upper plate and the middle plate are joined, the material pressing column is pressed into the sprue.

The waterproof structure cavity is located below the product cavity; the silicone inlet channel includes an upper mold channel located in the upper mold part and a lower mold channel located in the lower mold part; the upper mold channel extends from top to bottom, so as to be connected to the lower mold channel; at least a part of the lower mold channel extends to a position below the product cavity, and further extends from bottom to top so as to be in communication with the waterproof structure cavity.

A silicone inlet insert is further provided between the upper mold part and the lower mold part, and the upper mold channel is connected to the lower mold channel through a channel formed on the silicone inlet insert.

The upper mold channel substantially extends vertically to a position below a horizontal position of the product cavity; and the channel formed on the silicone inlet insert and a part of the lower mold channel that is in communication with the channel formed on the silicone inlet insert substantially extend horizontally.

An ejection mechanism provided in the lower mold part is further included, and the ejection mechanism is configured to eject upward, from the lower mold part, a product upon which the silicone waterproof structure is formed.

The ejection mechanism includes a lower mold insert mounted in the lower mold part, an ejector sleeved in the lower mold insert in a piston manner, and an ejector pin mounted at a lower end of the ejector and configured to apply an ejection force; the waterproof structure cavity is located at an outer side of the lower mold insert; the tops of the lower mold insert and the ejector support a product; and when the ejector performs upward ejection from the lower mold insert, the product is separated from the lower mold insert and the lower mold part.

A reset mechanism provided in the lower mold part is further included, and the reset mechanism comprises a return pin that is arranged in a manner of being linked with the ejector, being capable of ejecting upward from the lower mold part with the ejector, and being capable of carrying the ejector back to an original position. An elastic member configured to apply a reset force to the return pin is further included, and the elastic member is used to withstand a position change of the return pin.

A mold-opening pulling mechanism is further included, where the mold-opening pulling mechanism includes pulling pins respectively coupled to the upper mold part and the ejector from an upper position and a lower position; the pulling pins are arranged in a manner of being linked with the ejector, so as to pull, when the upper mold part is opened, the ejector to eject upward from the lower mold part; and preferably, the pulling pins move upward with the upper mold part by using a resin shutter partially embedded in the upper mold part; a lower end of the resin shutter is screwed to the pulling pins with openings in upper ends; and an upper end of the resin shutter is tightly embedded in a mounting hole opened in the upper mold part. The reset mechanism may be also included simultaneously, and at this time, the pulling pin may be a return pin of the reset mechanism.

Beneficial Effects of the Present Disclosure:

On one hand, the present disclosure has advantages of low cost and high efficiency of a conventional hot pressing device, and may solve problems of great difficulty, high cost, and low efficiency of liquid silicone molding used to mold a current mobile phone waterproof structure. As compared with a liquid silicone waterproof structure, a solid silicone waterproof structure formed according to the present disclosure has better toughness, sealing performance, and assembly lubricity, and is more durable, greater in performance, and lower in cost. On the other hand, the present disclosure overcomes deficiencies of a conventional solid silicone hot pressing technology that the conventional solid silicone hot pressing technology cannot manufacture a complex and highly accurate product structure, cannot manufacture a product with fine quality, and cannot manufacture a product with a high-quality outer appearance, and may manufacture a highly accurate and complex structure with a high-quality outer appearance.

As compared with the prior art, main advantages of the present disclosure are specifically represented in the following aspects:

1. Upon comparison, the high mobility of liquid silicone causes a great difficulty in manufacturing a mold, a maximum of 2-4 products can be molded in a set of molds, and the productivity is low; and the present disclosure adopts solid silicone, and therefore, the mobility is low, the difficulty of repairing a mold is small, 8-10 products may be generally molded in a set of molds, and the productivity may be 2-4 times higher.

2. Upon comparison, the cost of a liquid silicone raw material is high, and the cost of a solid silicone raw material adopted in the present disclosure may only be ¼ of that of the liquid silicone.

3. Upon comparison, the cost of a liquid silicone molding device is high; and the cost of the solid silicone hot pressing device functioning as a manufacturing device in the present disclosure may only be ⅙ to ¹⁄₁₀ of that of the liquid silicone molding device, and the cost of the device is relatively low.

4. The assembly handle and performances such as toughness of a material, a sealing performance, and product surface lubricity of a solid silicone molded product are better than those of a liquid silicone molded product, and solid silicone molding may use a smaller amount of interference, and can obtain a product with better assembly handle, a better waterproof performance, good material toughness, small wear when being used repeatedly, great fatigue resistance, and a long service life.

5. A mold of the manufacturing device of the present disclosure is of a simple structure and low cost.

To sum up, the present disclosure is better than the liquid silicone processing technology in aspects such as production cost, productivity, and a waterproof performance and a service life of a manufactured product.

DETAILED DESCRIPTION

The embodiments of the present disclosure are described below in detail with reference to accompany drawings. It shall be noted that the descriptions below are only exemplary descriptions, but are not intended to limit the scope and applications of the present disclosure.

With reference to FIG. 2 to FIG. 6, according to embodiments of the present disclosure, a manufacturing device for integrally forming a waterproof structure for a 3C electronic product mainly includes three parts consisting of a transfer system, a feeding system, and an ejection system. The transfer system mainly functions to forcibly extrude solid silicone of a solid form before a vulcanization reaction to enable the solid silicone to be a flowable silicone raw material. The feeding system mainly functions to introduce the flowable silicone raw material into a silicone structure cavity, so as to implement a function of filling a silicone part of a product 7. The ejection system mainly functions to eject the product 7 from a mold after the product 7 is molded, so as to enable the product 7 to be automatically detached.

Figure 1:
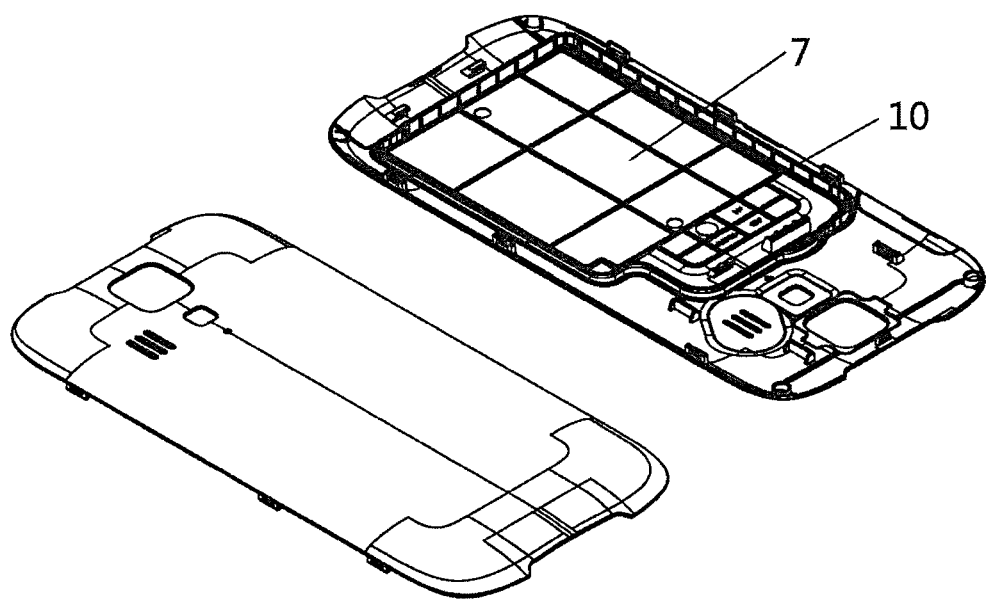
FIG. 1 is a schematic structural view of a product with a silicone waterproof structure manufactured according to the present disclosure.
Figure 2:
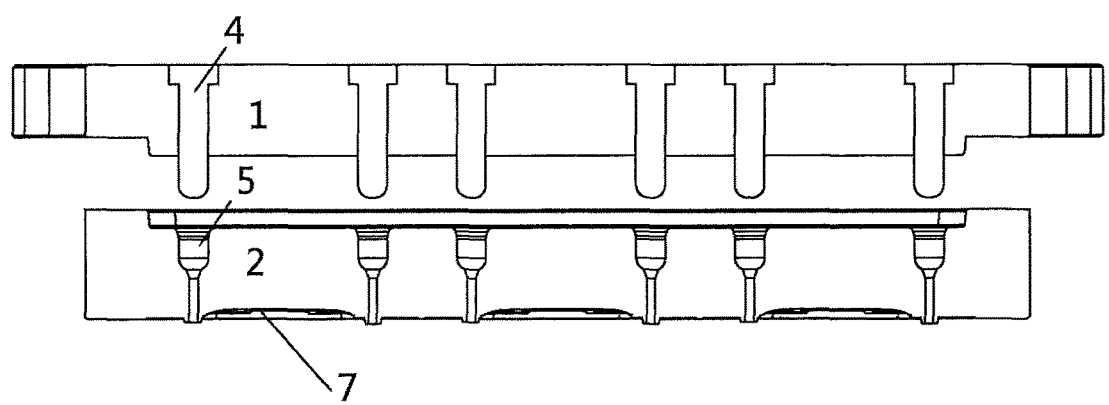
FIG. 2 is a schematic structural view of a manufacturing device according to an embodiment of the present disclosure (before a mold is clamped)
Figure 3:
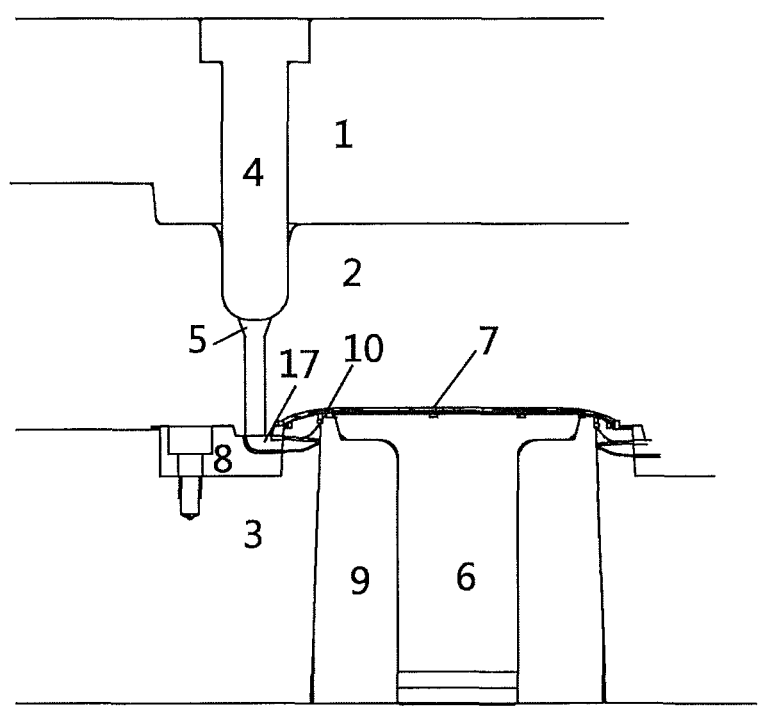
FIG. 3 is a schematic structural view of the manufacturing device according to the embodiment of the present disclosure (after the mold is clamped)

With reference to FIG. 2 and FIG. 3, a manufacturing device includes a mold including an upper mold part and a lower mold part, that is, a lower plate 3; a product cavity for placing a product 7 and a waterproof structure cavity connected to the product cavity and configured to form a waterproof structure on the product 7 are formed when the upper mold part and the lower plate 3 are joined; the upper mold part is opened with a solid silicone raw material sprue 5; the sprue 5 is in communication with the waterproof structure cavity through a silicone inlet channel 17; the mold is provided with a material pressing device matching the sprue 5; and the material pressing device is configured to extrude a solid silicone raw material in the sprue 5, so that the solid silicone raw material flows into the waterproof structure cavity through the silicone inlet channel 17, and forms a solid silicone waterproof structure 10 on the product after hot pressing molding.

The upper mold part may include an upper plate 1 and a middle plate 2 below the upper plate 1; the sprue 5 is opened at the top of the middle plate 2; the material pressing device includes a material pressing column 4 provided at the bottom of the upper plate 1; the upper plate 1 and the middle plate 2 can be joined or separated; and when the upper plate 1 and the middle plate 2 are joined, the material pressing column 4 is pressed into the sprue 5.

As shown in FIG. 3, in a preferred embodiment, a waterproof structure cavity is located below a product cavity; a silicone inlet channel 17 includes an upper mold channel located in an upper mold part such as a middle plate 2, and a lower mold channel located in a lower plate 3; the upper mold channel extends from top to bottom, so as to be connected to the lower mold channel; and at least a part of the lower mold channel extends to a position below the product cavity, and further extends from bottom to top so as to be in communication with the waterproof structure cavity.

As shown in FIG. 3, preferably, a silicone inlet insert 8 is further provided between the upper mold part and the lower plate 3, and the upper mold channel is connected to the lower mold channel through a channel formed on the silicone inlet insert 8. More preferably, the upper mold channel substantially extends vertically to a position below a horizontal position of the product cavity; and the channel formed on the silicone inlet insert 8 and a part of the lower mold channel that is in communication with the channel formed on the silicone inlet insert 8 substantially extend horizontally.

Figure 4:
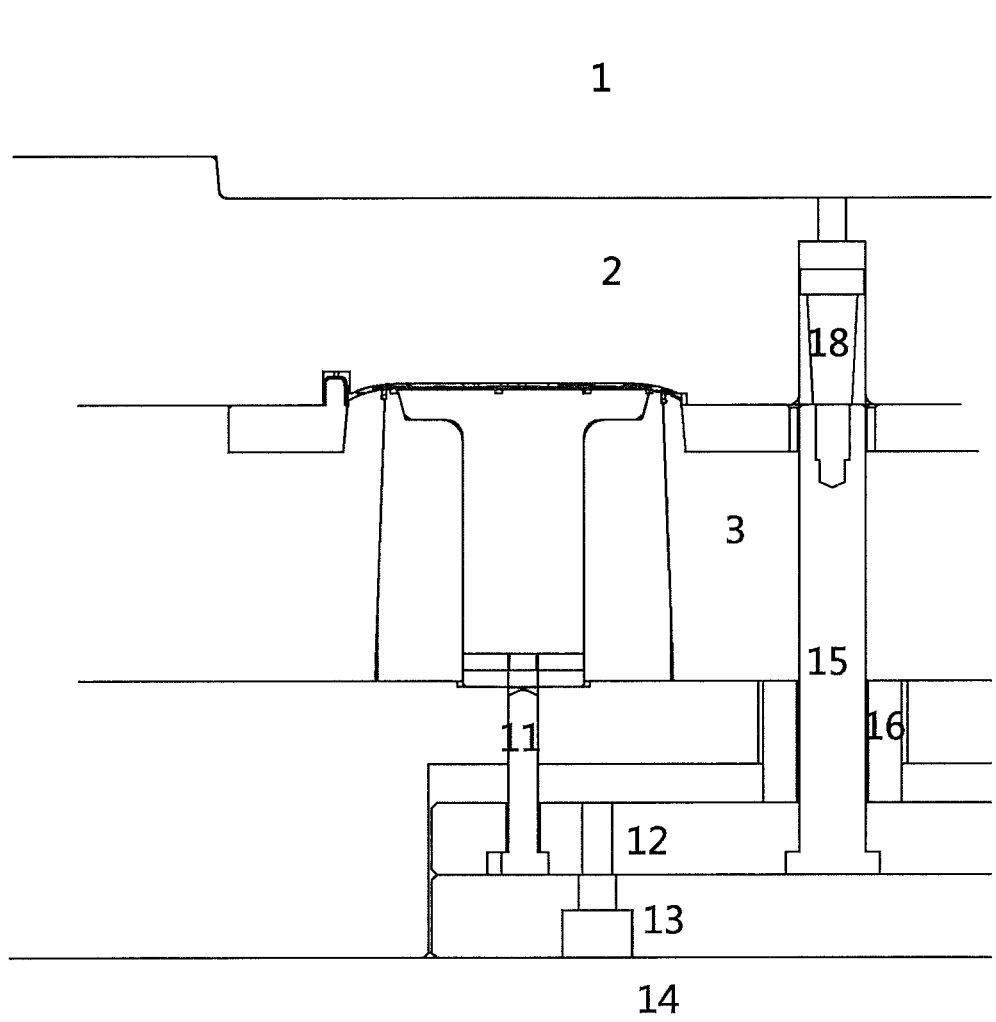
FIG. 4 is a schematic structural view of a manufacturing device according to another embodiment of the present disclosure (a clamped mold state)
Figure 5:
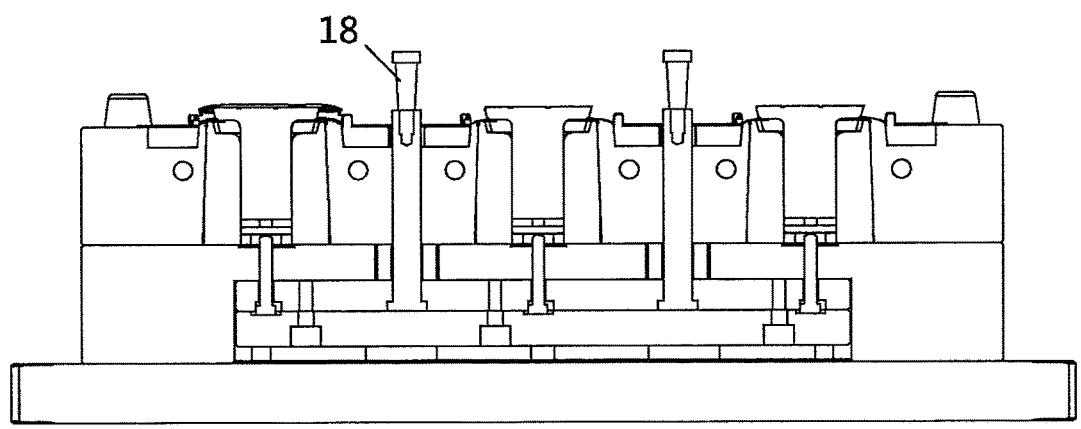
FIG. 5 is a schematic structural view of the manufacturing device according to another embodiment of the present disclosure (an ejected state)
Figure 6:
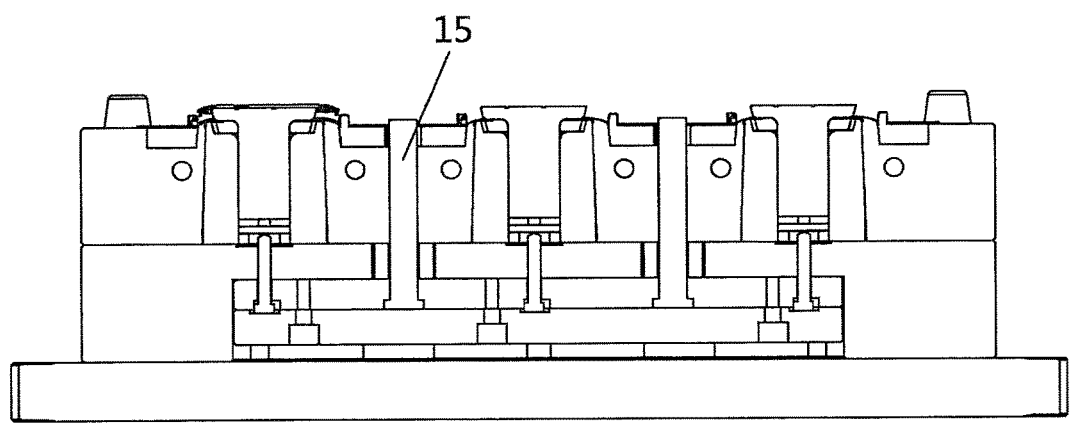
FIG. 6 is a schematic structural view of a manufacturing device according to yet another embodiment of the present disclosure (an ejected state).

As shown in FIG. 4 to FIG. 6, in some preferred embodiments, a manufacturing device further includes an ejection mechanism provided in a lower plate 3, and the ejection mechanism is configured to eject upward, from the lower plate 3, a product 7 for which a silicone waterproof structure is formed. In a further embodiment, an ejection mechanism may include a lower mold insert 9 mounted in a lower plate 3, an ejector 6 sleeved in the lower mold insert 9 in a piston manner, and an ejector pin 11 mounted at a lower end of the ejector 6 and configured to apply an ejection force; a waterproof structure cavity is located at an outer side of the lower mold insert 9; the tops of the lower mold insert 9 and the ejector 6 support a product 7; and when the ejector 6 performs upward ejection from the lower mold insert 9, the product 7 is separated from the lower mold insert 9 and the lower plate 3.

In a more preferred embodiment, a manufacturing device further includes a reset mechanism provided in a lower plate 3; the reset mechanism includes a return pin 15; the return pin 15 is arranged in a manner of being linked with an ejector 6, may eject upward from the lower plate 3 with the ejector 6, and may be pressed into the lower plate 3 so as to carry the ejector 6 back to an original position by using a linkage relationship; and the reset mechanism is provided with an elastic member configured to apply a reset force to the return pin 15, for example, a spring 16, and the spring 16 is used to withstand a position change of the return pin 15, so as to enable the return pin 15 to go back to an original position, thereby driving the ejector 6 to the original position.

The lower plate 3 may be mounted on a base 14; a slot may be provided in the base 14; the slot is provided with an ejector pin surface plate 12 and an ejector pin bottom plate 13; an ejector pin 11 and the return pin 15 penetrate through the ejector pin surface plate 12 to be supported on the ejector pin bottom plate 13; and the ejector pin bottom plate 13 may be ejected or lowered in the slot by a certain distance, so as to lift or lower the ejector pin 11 and the return pin 15.

As shown in FIG. 4 and FIG. 5, in a more preferred embodiment, a mold-opening pulling mechanism is further provided; the mold-opening pulling mechanism include pulling pins respectively coupled to an upper mold part and an ejector 6 from an upper position and a lower position; the pulling pins are arranged in a manner of being linked with the ejector 6, so as to pull, when the upper mold part is opened, the ejector 6 to eject upward from the lower plate 3. The pulling pins may also penetrate through an ejector pin surface plate 12 to be supported on an ejector pin bottom plate 13. Preferably, the pulling pins move upward with the upper mold part by using a resin shutter 18 partially embedded in a middle plate 2; a lower end of the resin shutter 18 is inserted into openings on upper ends of the pulling pins; the resin shutter 18 is screwed to the pulling pins; and an upper end of the resin shutter 18 is tightly embedded into a mounting hole opened in the middle plate 2, but may be detached from the middle plate 2 when a downward pulling force applied to the resin shutter 18 exceeds a threshold. The mold-opening pulling mechanism functions to pull the ejector 6 when opening a mold is performed, so as to eject a product. With this structure, independently arranging en ejection apparatus on a hot pressing machine may be omitted, that is, ejection of a product can be implemented no matter the machine has an ejection function or not. This embodiment may also include the aforementioned reset mechanism, and in this case, a pulling pin may also function as a return pin 15 of a reset mechanism.

According to embodiments of the present disclosure, a manufacturing method for integrally forming a waterproof structure for a 3C electronic product includes the following steps:

when a mold is opened, a certain amount of solid silicone raw material is fed into a sprue, and the required amount may be determined according to the volume of a silicone waterproof part of a product;

a material pressing column may be pressed into the sprue to extrude the solid silicone raw material in the sprue and keeps extruding to enable the solid silicone raw material to flow, and the flowable raw material flows into a silicone waterproof structure cavity through a silicone inlet channel, so as to complete the filling of a silicone part of the product;

the flowable solid silicone is heated with a high temperature in the mold and therefore to have a vulcanization reaction, and finally to be solidified and molded into a silicone waterproof structure, thereby completing integral molding of a waterproof product structure; and the mold is opened, and the product is ejected from a lower mold part by using an ejector, so as to enable the product to be automatically detached.

The material pressing column may be replaced by a pressing device of another form.

The device and the manufacturing method of the present disclosure may be used to manufacture waterproof structures of various electronic products such as a mobile phone, a tablet computer, and a wearable device.

The above content is further detailed descriptions of the present disclosure with reference to specific/preferred embodiments, and it shall not be considered that specific embodiments of the present disclosure are limited to these descriptions. A person of ordinary skill in the art may make various replacements or variations on the described embodiments without departing from the idea of the present disclosure, and these replacements or variations shall be considered to be within the protection scope of the present disclosure.

What is claimed is:

1. A manufacturing device for integrally forming a waterproof structure for a 3C electronic product, comprising:
a mold comprising an upper mold part and a lower mold part; and
an ejection mechanism provided in the lower mold part,
wherein a product cavity for placing a product and a waterproof structure cavity connected to the product cavity and configured to form a waterproof structure on the product are formed when the upper mold part and the lower mold part are joined,
wherein the upper mold part is opened with a solid silicone raw material sprue,
wherein the sprue is in communication with the waterproof structure cavity through a silicone inlet channel,
wherein the mold is provided with a material pressing device matching the sprue,
wherein the material pressing device is configured to extrude a solid silicone raw material in the sprue, so that the solid silicone raw material flows into the waterproof structure cavity through the silicone inlet channel,
wherein the ejection mechanism is configured to eject upward, from the lower mold part, a product upon which the silicone waterproof structure is formed,
wherein the ejection mechanism comprises a lower mold insert mounted in the lower mold part, an ejector sleeved in the lower mold insert in a piston manner, and an ejector pin mounted at a lower end of the ejector and configured to apply an ejection force,
wherein the waterproof structure cavity is located at an outer side of the lower mold insert,
wherein the tops of the lower mold insert and the ejector support a product, and
wherein when the ejector performs upward ejection from the lower mold insert, the product is separated from the lower mold insert and the lower mold part.

2. A method of using the manufacturing device of claim 1 to integrally form a waterproof structure for a 3C electronic product, comprising the following steps:
a. feeding a predetermined amount of a solid silicone raw material into a sprue;
b. extruding the solid silicone raw material in the sprue, so that the solid silicone raw material flows into, through a silicone inlet channel, a waterproof structure cavity in the mold in which a product is placed; and
c. heating the solid silicone with a high temperature in the mold to have a vulcanization reaction, and finally to integrally form a silicone waterproof structure on the product.

3. The method according to claim 2, further comprising the following step after step c:
d. separating an upper mold part of the mold upwardly from a lower mold part for supporting the product, and ejecting the product with the silicone waterproof structure upward from the lower mold part by using an ejection mechanism provided in the lower mold part.

4. The manufacturing device for integrally forming a waterproof structure for a 3C electronic product according to claim 1, wherein the upper mold part comprises an upper plate and a middle plate below the upper plate; the sprue is opened at the top of the middle plate; the material pressing device comprises a material pressing column provided at the bottom of the upper plate; the upper plate and the middle plate can be joined or separated; and when the upper plate and the middle plate are joined, the material pressing column is pressed into the sprue.

5. The manufacturing device for integrally forming a waterproof structure for a 3C electronic product according to claim 1, wherein the waterproof structure cavity is located below the product cavity; the silicone inlet channel comprises an upper mold channel located in the upper mold part and a lower mold channel located in the lower mold part; the upper mold channel extends from top to bottom, so as to be connected to the lower mold channel; at least a part of the lower mold channel extends to a position below the product cavity, and further extends from bottom to top so as to be in communication with the waterproof structure cavity.

6. The manufacturing device for integrally forming a waterproof structure for a 3C electronic product according to claim 5, wherein the upper mold channel substantially extends vertically to a position below a horizontal position of the product cavity; and the channel formed on the silicone inlet insert and a part of the lower mold channel that is in communication with the channel formed on the silicone inlet insert substantially extend horizontally.

7. The manufacturing device for integrally forming a waterproof structure for a 3C electronic product according to claim 1, further comprising: a reset mechanism provided in the lower mold part, wherein the reset mechanism comprises a return pin that is arranged in a manner of being linked with the ejector, being capable of ejecting upward from the lower mold part with the ejector, and being capable of carrying the ejector back to an original position, and an elastic member configured to apply a reset force to the return pin; and the elastic member is used to withstand a position change of the return pin.

8. The manufacturing device for integrally forming a waterproof structure for a 3C electronic product according to claim 1, further comprising: a mold-opening pulling mechanism, wherein the mold-opening pulling mechanism comprises pulling pins respectively coupled to the upper mold part and the ejector from an upper part and a lower part; the pulling pins are arranged in a manner of being linked with the ejector, so as to pull, when the upper mold part is opened, the ejector to eject upward from the lower mold part.

9. The manufacturing device for integrally forming a waterproof structure for a 3C electronic product according to claim 5, wherein a silicone inlet insert is further provided between the upper mold part and the lower mold part, and the upper mold channel is connected to the lower mold channel through a channel formed on the silicone inlet insert.

10. The manufacturing device for integrally forming a waterproof structure for a 3C electronic product according to claim 8, wherein the pulling pins move upward with the upper mold part by using a resin shutter partially embedded in the upper mold part; a lower end of the resin shutter is screwed to the pulling pins with openings in upper ends; and an upper end of the resin shutter is tightly embedded into a mounting hole opened in the upper mold part.

* * * * *